US008810625B2

(12) United States Patent
Williams, IV et al.

(10) Patent No.: US 8,810,625 B2
(45) Date of Patent: Aug. 19, 2014

(54) SYSTEM AND METHOD FOR REMOTELY CONFIGURING AND CAPTURING A VIDEO PRODUCTION

(75) Inventors: Roy H. Williams, IV, Austin, TX (US); Jacob S. Williams, Austin, TX (US); Luke D. Wilbanks, Austin, TX (US)

(73) Assignee: Wizard of Ads, SunPop Studios Ltd., Austin, TX (US)

( * ) Notice: Subject to any disclaimer, the term of this patent is extended or adjusted under 35 U.S.C. 154(b) by 287 days.

(21) Appl. No.: 13/456,556

(22) Filed: Apr. 26, 2012

(65) Prior Publication Data

US 2013/0286153 A1    Oct. 31, 2013

(51) Int. Cl.
*H04N 7/14*    (2006.01)
(52) U.S. Cl.
USPC ................. 348/14.05; 348/14.02; 348/14.03; 348/14.07
(58) Field of Classification Search
USPC ................................ 348/14.02, 14.03, 14.07
See application file for complete search history.

(56) References Cited

U.S. PATENT DOCUMENTS

| | | | | |
|---|---|---|---|---|
| 7,557,840 B2* | 7/2009 | Ladouceur et al. | ...... | 348/240.99 |
| 7,649,551 B2* | 1/2010 | Ohmura et al. | ............ | 348/211.3 |
| 8,014,768 B2* | 9/2011 | Ackley | .......................... | 455/420 |
| 8,203,590 B2* | 6/2012 | Thielman et al. | .......... | 348/14.05 |
| 2002/0075461 A1 | 6/2002 | Peatross et al. | | |
| 2002/0088009 A1 | 7/2002 | Dukiewicz et al. | | |
| 2003/0112337 A1* | 6/2003 | Sato et al. | ................ | 348/211.13 |
| 2003/0153351 A1* | 8/2003 | Jung | .............................. | 455/550 |
| 2004/0189805 A1 | 9/2004 | Seitz | | |
| 2005/0122392 A1* | 6/2005 | Johansen et al. | ........... | 348/14.09 |
| 2005/0207433 A1* | 9/2005 | Ni | .................................. | 370/401 |
| 2005/0283717 A1 | 12/2005 | Giraldo et al. | | |
| 2006/0242678 A1* | 10/2006 | Kostadinovich | .............. | 725/105 |
| 2007/0116114 A1 | 5/2007 | Kuppens et al. | | |
| 2007/0206090 A1 | 9/2007 | Barraud et al. | | |
| 2007/0263076 A1 | 11/2007 | Andrews et al. | | |
| 2009/0153804 A1 | 6/2009 | Giraldo et al. | | |
| 2009/0195655 A1 | 8/2009 | Pandey | | |
| 2009/0256970 A1 | 10/2009 | Bilbrey et al. | | |
| 2010/0182513 A1 | 7/2010 | DeOtte | | |
| 2010/0293465 A1 | 11/2010 | Kleinschmidt et al. | | |
| 2011/0298935 A1 | 12/2011 | Segal | | |

* cited by examiner

*Primary Examiner* — Joseph J Nguyen
(74) *Attorney, Agent, or Firm* — Larson Newman, LLP

(57) ABSTRACT

A remote video capture system includes a first camera, a control device, a video device, and a server. The first camera records a first video during a video shoot in response to a record signal from a remote device. The control device receives a record mode request signal associated with a first camera from the remote device and adjusts a view of the first camera based on received adjustment signals. The video device provides a video feed from the first camera to the remote device in response to the record mode request signal. The server is in communication with the first camera and with a second camera. The server creates a video chat session between the server and the remote device, provides a substantially real-time video from the second camera to the remote device via the video chat session, and stores the first video when the video shoot is completed.

7 Claims, 6 Drawing Sheets

SYSTEM AND METHOD FOR REMOTELY CONFIGURING AND CAPTURING A VIDEO PRODUCTION

FIELD OF THE DISCLOSURE

This disclosure generally relates to a video capture system, and more particularly relates to a system and method for remotely configuring and capturing a video production.

BACKGROUND

Companies, businesses, or people can create videos for a variety of uses, such as instructional videos, commercials, informative videos, and the like. The company, business, or person may need to hire a video production company to produce the video for them. To create the video the person or persons that may be in the video can then go to the production company's location to shoot the video, the production company can send an entire production crew including equipment and personnel to the company's office, or the like.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
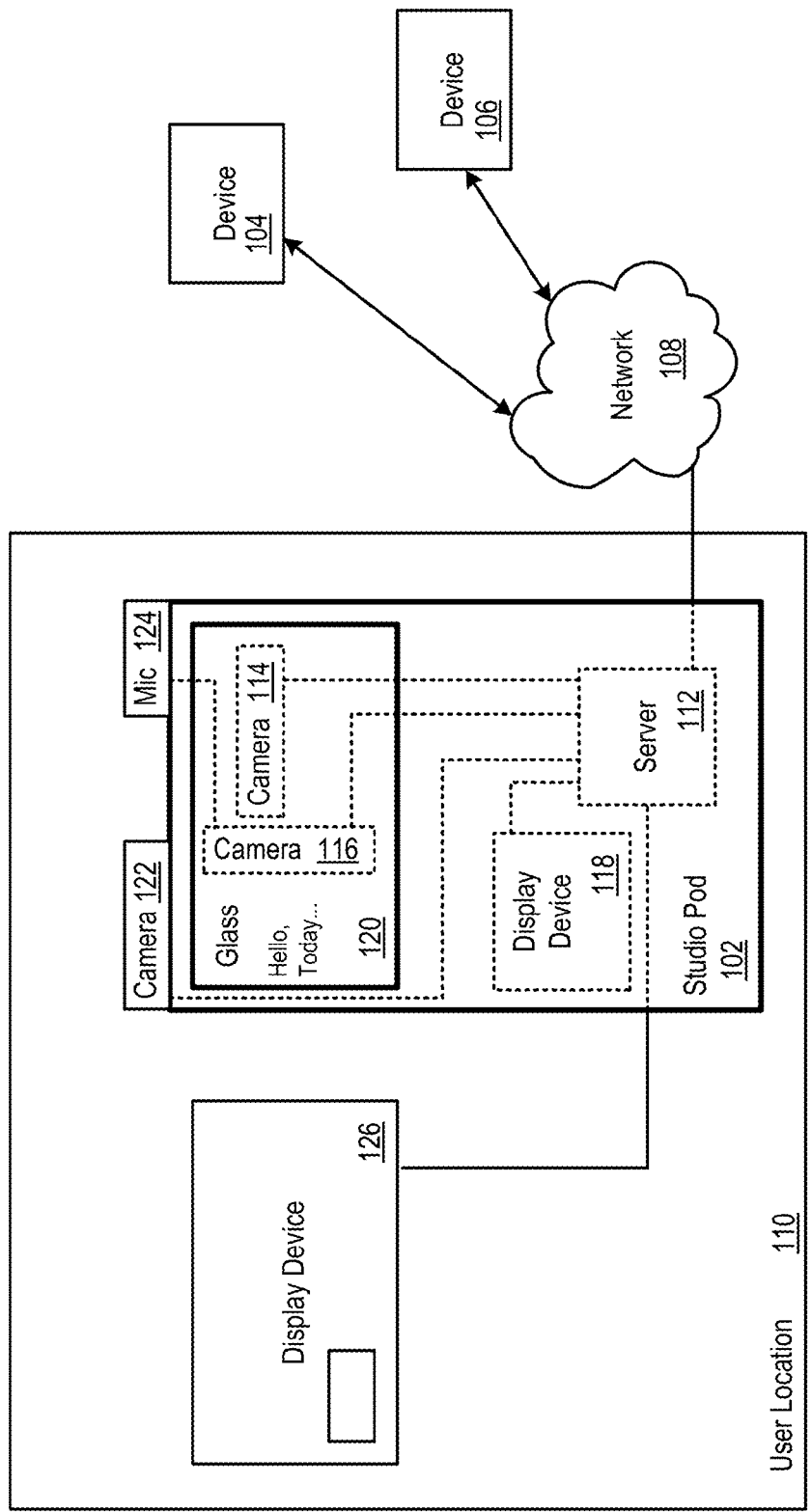
FIG. 1 is a block diagram of a remote video capture system in accordance with at least one embodiment of the present disclosure.

FIG. 1 shows a remote video capture system 100 in accordance with at least one embodiment of the present disclosure. The remote video capture system 100 includes a studio pod 102, which is in communication with devices 104 and 106 via a network 108. A user can have the studio pod 102 installed at a user location 110, such as a business location or the like. The studio pod 102 can be any type of enclosure or containment device capable of enclosing a server 112, cameras 114 and 116, and a display device 118. The studio pod 102 also includes a glass 120 that covers an opening in the studio pod 102. The user location can also include a camera 122, a microphone 124, and a display device 126. The glass 120 can be a type of glass typically used in a teleprompter device, so that the cameras 114 and 116 can record videos through the glass 120. The devices 104 and 106 are in communication with the server 112, which in turn is in communication with the cameras 114 and 116, and with the display device 118. The server 112 is also in communication with the camera 122 connected to the exterior of the studio pod 102, and with the display device 126. The display devices 118 and 126 can be monitors, televisions, or the like. The camera 116 is in communication with the microphone 124.

The display device 118 can be positioned such that an image displayed on the display device 118 can be reflected by the glass 120. The cameras 114 and 116 can be located behind the glass 120, and can record videos through the glass 120 while the glass is reflecting an image of the display device 118. The devices 104 and 106 can be any type of computing device, such as a personal computer, a portable computer, a tablet computer, a cellular telephone, or any other type of mobile computing device. In an embodiment, the server 112 can be a general computer, a specialized server, or the like. The cameras 114 and 116 can be high definition video cameras, standard definition video cameras, or the like. For example, the camera 116 can be a high definition camera, such that the resolution of the video is 1080×1920.

An individual or director can be located remotely from the user location 110 and the studio pod 102, but can access the components within the studio pod 102 via the network 108. The director can utilize one or both of the devices 104 and 106 to configure and control the filming of a specific video. When the studio pod 102 has been set up at the user location 110, the user can contact the director to request a video shoot. The user can select between multiple shooting options, such as a script method, a bullet point method, an unscripted method, or the like. The scripted method can provide scrolling text lines, such as "Hello, today . . . " as shown in FIG. 1, on the display device 118, which can then be reflected to the user by the glass 120 to keep the flow of the video. The bullet point method can offer the user a combination of bullet points on the display device 118 and glass 120, and a conversation with and/or promptings from the director to keep the flow of the video. The unscripted method can involve a conversation with and/or promptings from the director to keep the flow of the video without scripted lines or bullet points being displayed on the display device 118 and glass 120.

When the user has selected a filming method, the user can then access an online calendar for the director to select a desired time to shoot the video. The director can then utilize one of the devices 104 or 106, such as the device 104, to connect to the different components within the studio pod 102 prior to the filming so that different settings for the video shoot can be set up. The director can use the device 104 to remotely log onto the server 112 and set up a video chat between the server 112 and the device 104. The camera 122 can provide video of the user location 120 during the video chat. The director can then set up the video shoot via a remote video set up graphical user interface (GUI) 204 that can be displayed on a display 202 of the device 104 as shown in FIG. 2.

Figure 2:
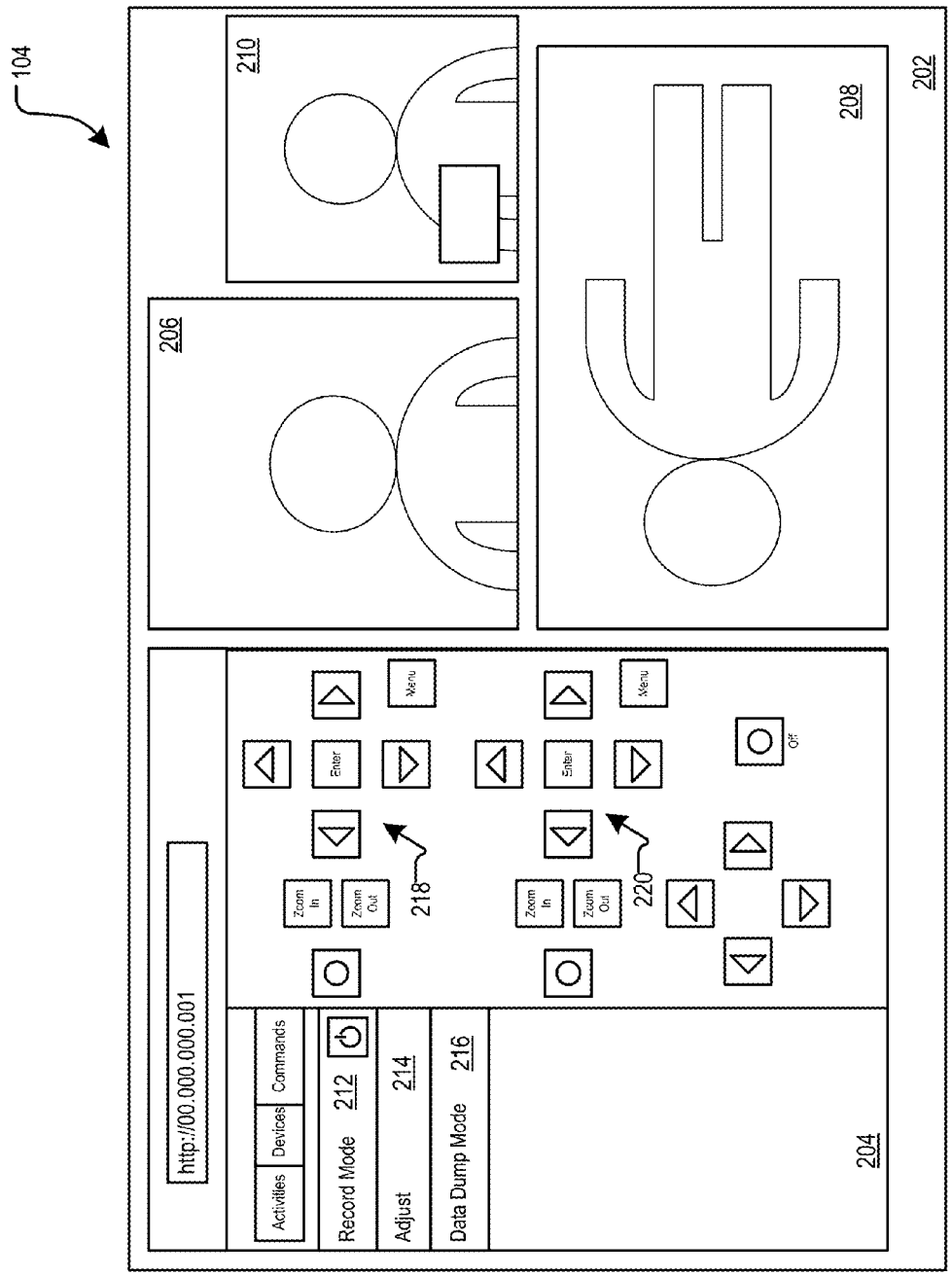
FIG. 2 is exemplary remote video set up graphical user interface in accordance with at least one embodiment of the present disclosure.

FIG. 2 shows the display 202 of the device 104 in accordance with at least one embodiment of the present disclosure. The display 202 includes the remote video set up GUI 204, a first camera video display 206, a second camera video display 208, and a video chat display 210. The remote video set up GUI 204 includes different soft buttons for controlling the video shoot, such as record mode button 212, adjust button 214, data dump mode button 216, and camera control buttons 218 and 220. In an embodiment, the camera control buttons 218 can be assigned to one camera, such as camera 114, and the camera control buttons 220 can be assigned to the other camera, such as camera 116. In an embodiment, the display device 126 can be used to provide the video feed from the device 104 to the user. In another embodiment, the display device 118 can provide the video feed from the device 104 to the user.

The director can select the adjust button 214, and in response the device 104 can send an adjustment request signal to the studio pod 102 and the cameras 114 and 116. The cameras 114 and 116 can then be placed in a mode that allows the cameras 114 and 116 to have their respective views adjusted, such as by adjusting the pan, tilt, zoom, focus, white balance, exposure, and the like. A video feed from cameras 114 and 116 can then be sent to the device 104 via the server 112 and/or another device, such as a sling box or the like. The director can utilize the video images received from the server 112 and displayed on the camera video display 208 to adjust the shot of each camera to get a desired view from each of the cameras. For example, the director can change the view of camera 114 by selecting one or more of the camera control buttons 218. As the director changes the view of the camera 114, the video shown in the first camera video display 206 can show the adjustments made by camera 114. Similarly, the director can use the camera control buttons 220 to adjust the view of the camera 116. As the director changes the view of the camera 116, the video shown in the second camera video display 208 can show the adjustments made by camera 116.

The camera control buttons 218 and 220 on the GUI 204 can be programmed so that a single click or selection of one of the soft buttons causes a predefined adjustment on the camera. For example, the zoom in button of the camera control buttons 218 can be programmed so that each time the director selects the zoom in button the camera 114 zooms in a predefined amount. Similarly, the zoom out button of the camera control buttons 218 can be programmed so that each time the director selects the zoom out button the camera 114 zooms out a predefined amount. When the director has completed the adjustment of the cameras 114 and 116, the director can select the record button of both the camera control buttons 218 and 220 to start the recording of the video shoot.

Referring back to FIG. 1, the device 104 can then send a start record request to the cameras 114 and 116 via the network 108. The cameras 114 and 116 can then start recording. During the recording process, the video chat can continue between the user and the director via the device 104 and the server 112. Thus, the user can view and hear the director in substantially real-time, and the director similarly can view and hear the user in substantially real-time. Therefore, the director can interact with the user to give any needed prompts during the recording process. In another embodiment, the director can end the video chat session when the video shoot starts such that the individual can say whatever her or she wants without interaction with the director. For example, the video shoot can be video message recorded for a person during a special event, such as a wedding. While the cameras 114 and 116 are recording, the microphone 124 can be a used to provide the audio from the video shoot to the camera 114, such that high quality audio can be provided for the video shoot. The audio from the microphone 124 can be split into first and second channels before being provided to the camera 116. The audio inputs to the camera 116 can be adjusted so that the volume of one channel can be lowered and the volume of the other channel can be boosted.

The cameras 114 and 116 can record during the video shoot in the orientation set by the director before the recording began, such that each of the cameras 114 and 116 can record a different view of the video shoot. For example, camera 114 can record a close-up view of the user, such as a shoulder up view of the user as shown in the first camera video display 206. The camera 116 can record a wide angle view, such as an entire body view of the user. The camera 116 can also be mounting on its side within the studio pod 102 so that the video recorded by the camera 116 is horizontal, as shown in display view 208 of FIG. 2. The different views recorded by the cameras 114 and 116 can be used by the director during an editing process described below.

When the video shoot is completed, the director can select the record buttons of the camera control buttons 218 and 220, which causes the device 104 to send a stop recording signal to the camera 114 and 116 via the network 108. The director can then select the data dump mode soft button 216 of FIG. 2, which can cause the cameras 114 and 116 to become external drives of the server 112. The director can log onto the server 118 to transfer the videos from the cameras 114 and 116 to the video in the server 112. Thus, the video from camera 114 and the video/audio from camera 116 for the video shoot can be stored together in the server 112 for later access.

Figure 3:
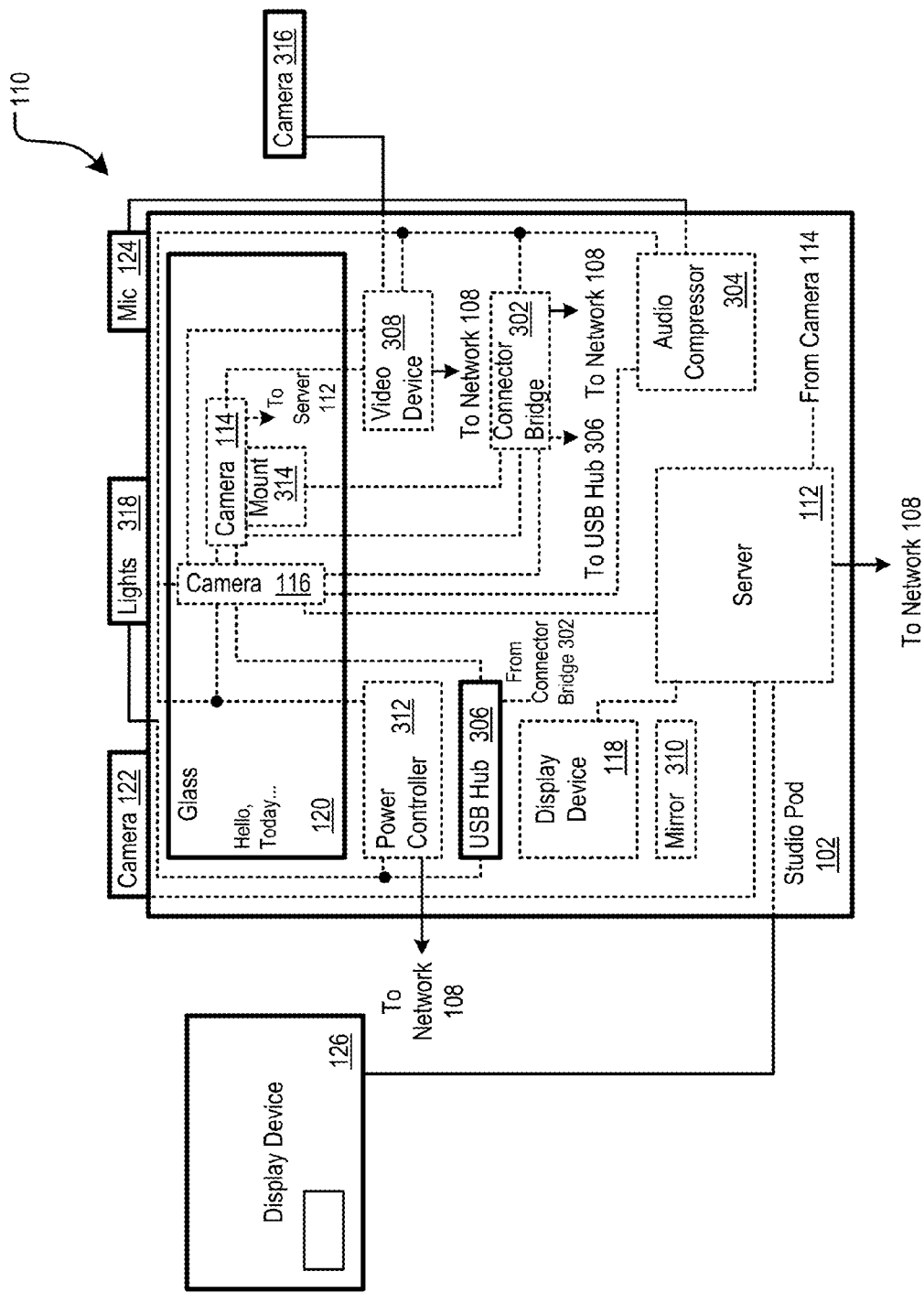
FIG. 3 is a block diagram of a studio pod at a user location of the remote video capture system in accordance with at least one embodiment of the present disclosure.

FIG. 3 shows the user location 110 of the remote video capture system 100 in accordance with at least one embodiment of the present disclosure. The user location 110 includes the studio pod 102 and the display device 126. The studio pod 102 includes a connector bridge 302, an audio compressor 304, a universal serial bus (USB) hub 306, a video device 308, a mirror 310, a power controller 312, an electronic/robotic camera mount 314, a camera 316, lights 318, the server 112, the cameras 114 and 116, the display device 118, the glass 120. Each of the server 112, the connector bridge 302, the video device 308, and the power controller 312 are in communication with the devices 104 and 106 via the network 108. In an embodiment, the server 112, the connector bridge 302, the video device 308, and the power controller 312 can all be connected to a router to provide a single connection to the network 108. The server 112 is in communication with the cameras 114, 116, and 122, with the display devices 118 and 126, with the connector bridge 302, and with the audio compressor 304. The connector bridge 302 is in communication with the cameras 114 and 116, with the robotic camera mount 314, and with the power controller 312. The audio compressor 304 is in communication with the camera 116, and with the microphone 124, and with the power controller 312. The video server 308 is in communication with cameras 114, 116, and 316. In an embodiment, server 112 and display device 118 can be incorporated into a single device, or can be in multiple devices. In an embodiment, the server 112, the cameras 114 and 116, the display device 118, the connector bridge 302, the audio compressor 304, the video device 308, the mirror 310, the power controller 312, and the robotic camera mount 314 can all be located within an enclosure of the studio pod 102. The camera 122, the microphone 124, the display device 126, the USB hub 306, the camera 316, and the lights 318 can be located outside of the enclosure of the studio pod 102. The images on the display device 118 can be reflected off of the mirror 310 and then off of the glass 120 before being viewed by a user of the studio pod 102.

As described above with respect to FIGS. 1 and 2, the director can utilize the remote video set up GUI 204 of device 104 to configure the cameras 114 and 116 for a video shoot prior to the video shoot occurring. The director can send a power on request to the power controller 312, which can have two power groups that the power controller 312 provides power to. The first power group can be the devices that are internal to the studio pod 102, such as the cameras 114 and 116, the display device 118, the connector bridge 302, the audio compressor 304, the USB hub 306, and the video device 308. The second power group can be the devices that are external to the studio pod 102, such as the camera 316, the display device 126, and the lights 318. The director can utilize the device 104 to connect with the power controller and to select the group or groups to be powered on. The power controller 312 can then provide power to the selected group or groups.

When the director has powered on the devices in the studio pod 102, the director can receive a video feed from the camera 316 via the video device 308. The camera 316 can provide video of the front of the studio pod 102 so that the director can verify that all of the devices are powered on. When the director has verified that the devices are all powered on, the director can disconnect from the video feed of the camera 316.

The connector bridge 302 can have different ports that can be associated with different devices in the studio pod 102 and/or can be allocated to set a device, such as the camera 114, into different operational modes. The connector bridge 302 can send a signal to a device in response to a request received from the device 104. For example, if the device 104 sends a record mode request for camera 114 to the connector bridge 302, the connector bridge 302 can send a signal out of a port corresponding to the camera 114 to cause the camera 114 to start recording. In an embodiment, the signal can be transmitted via a cable to the camera 114, and the end of the cable can include an infrared (IR) light emitting diode (LED) that can provide a corresponding IR signal to the camera 114. In another embodiment, a router can receive the start recording request and can then transmit a wireless fidelity (WiFi) signal to cause the camera 114 to start recording. Also, the connector bridge 302 can be used to select an input channel of the display devices 118 and 126. For example, the input can be the video chat session, the text associated with the video shoot, or the like.

The director can select the record mode button 212 and in response the device 104 sends a record mode request for cameras 114 and 116 to the connector bridge 302 via the network 108. The connector bridge 302 can then communicate the recording mode request to cameras 114 and 116, which in turn can enter a recording mode. The video from cameras 114 and 116 can then be sent to the device 104 via the video device 308, which can be a sling box or the like. The director can utilize the video images received from the video device 308 and displayed on the camera video displays 206 and 208 to adjust the shot of each camera to ensure the best view for the video shoot. The connector bridge 302 can provide the adjustment signals to the robotic camera mount 314 to adjust the pan and tilt of camera 114. When the cameras 114 and 116 are adjusted to have a desired filming coverage, the director can press the record button of both the camera control buttons 218 and 220.

The director can then send a start record request to the cameras 114 and 116 via the device 104 and the connector bridge 302. The cameras 114 and 116 can then start recording. During the recording process, the director can interact with the user to give prompts via the video chat session created between the device 104 and the server 112. The video display of the server 112 for the video chat can be output to the display device 126. While the cameras 114 and 116 are recording, the microphone 124 can provide an audio signal to the audio compressor 304. The audio from the microphone 124 can split into first and second channels before the audio is provided to the audio compressor 304. In another embodiment, the microphone 124 can be a stereo microphone, such that the audio from during the video shoot is recorded in left and right channels. The audio compressor 304 can adjust the volume of the first and second channels prior to sending the audio to the camera 116. For example, the audio compressor 304 can be configured to boost the volume of the first channel and to lower the volume of the second channel. The volume boosting of the first channel can be used to compensate for users that talk soft, and lowering the volume of the second channel can be used to compensate for users that talk loud. Also, during the video shoot, the audio input into the camera 116 can be output to the server 112 via an audio output of the camera 116. The audio provided to the server 112 can be provided as the audio of the video chat session during the video shoot, such that the director can listen to the actual audio being recorded during the video shoot.

When the video shoot is complete, the director can access the cameras 114 and 116 via the device 104 and the connector bridge 302 to end the recording mode. The director can then select the data dump mode soft button 216 of FIG. 2, which causes the connector bridge 302 to provide a signal to the cameras 114 and 116 to cause the cameras 114 and 116 to be external drives of the server 112. The connector bridge 302 can include contact switches associated with to switches in the USB hub 306 that can be closed in response to the data dump request from the director. When the switches on the USB hub 306 are closed, an active USB connection between the server 112 and the cameras 114 and 116 is completed through the USB hub 306. The cameras 114 and 116 can automatically switch to data mode in response to the active USB connection with the server 112. The director can then log onto the server 112 can transfer the respective videos to the server 112. Thus, the video from camera 114, the video/audio from camera 116 for the video shoot can be stored together in the server 112 for later access. In an embodiment, the user may have additional videos, graphics, or the like to be used in composing a final version of the video on a USB device. The user can plug the USB device into the USB hub 306, can then press a switch on the USB hub 306 to provide the USB device as an external drive to the server 112. The director can then remotely transfer the files from the USB device to the server 112, and then eject the USB device from the server 112 when the transfer is completed. In another embodiment, the director can utilize file transfer protocol (FTP) to transfer the videos from the cameras 114 and 116 to a remote server without storing the videos on the server 112. The director can then log out of the remote connection with the studio pod 102.

The director can then access the server 112, via the device 106, at a later time and retrieve a proxy video/audio file associated with the video/audio file from the video shoot to edit the video file. The proxy video/audio file can have a lower resolution than the video/audio file stored on the server. The proxy file can contain all of the different views from the cameras 114 and 116, can contain timestamps that correspond to timestamps of the original file, and the like. In an embodiment, the cameras 114 and 116 can record the video shoot with a higher resolution than needed for a final video, and the director can use the higher resolution during the editing process to make different views in the file.

The director can use any video editing software available to edit the proxy file. For example, the director can combine different portions of the video from the camera 114 with different portions of the video from the camera 116 to create a single video with a dynamically changing view point. The director can create the dynamic view points in the file by zooming in and out at different points in the video. The zooming can be performed by either reducing the resolution of the video or by increasing the resolution of the video (up to the resolution of the original video). The video from camera 116 can be rotated from the horizontal orientation to a vertical orientation, such that a height of the video is larger than a desired video format. Thus, the director can crop the re-oriented video to include different portions of the video without reducing resolution of the video below a desired resolution.

The director can use the video editing software to filter, scale, orientate, crop, and distort the proxy video to create movement in the single proxy video. When the single proxy video is complete, the director can store the proxy video to a server that the user can access so that both the director and the user can view the video and make different comments or suggestions via video viewing software. For example, the director can view the video and place an indicator at a specific location in the view file, and can insert a comment about something that should be changed. The video viewing software can detect the comment and can send a message to both the director and the user to indicate that a new comment has been added to the video. The user and the director can then provide follow up comments that the director can use during a final edit of the proxy video.

The proxy video can maintain the same timestamps as the original video stored on the server 112 throughout the editing process. Thus, when the final proxy video is complete, the director can send the proxy video to the server 112, and use the timestamps and edits in the proxy video to edit the video on the server 112 to create a final production video for the user. In another embodiment, the director can transfer the original videos stored on the server 112 to the remote server without first creating the proxy file. In this embodiment, the director can use the video editing software to filter, scale, orientate, crop, and distort the original videos to create movement in a single final video.

While the remote video capture system 100 has been described with respect to the studio pod 102 being in a fixed location, in an embodiment the studio pod 102 can be mounted on wheels such that the studio pod 102 can be physical moved during the video shoot. In another embodiment, the user can have access to the remote video set up GUI 204 via the display device 126 being a touch screen device, such that the user can configure the cameras 114 and 116, and can record the video shoot in a similar fashion as described above for the director. In this embodiment, when the user has completed the video shoot, the director can access the video on the server 112 and perform edits on the video as described above to create a final production video for the user.

Figure 4:
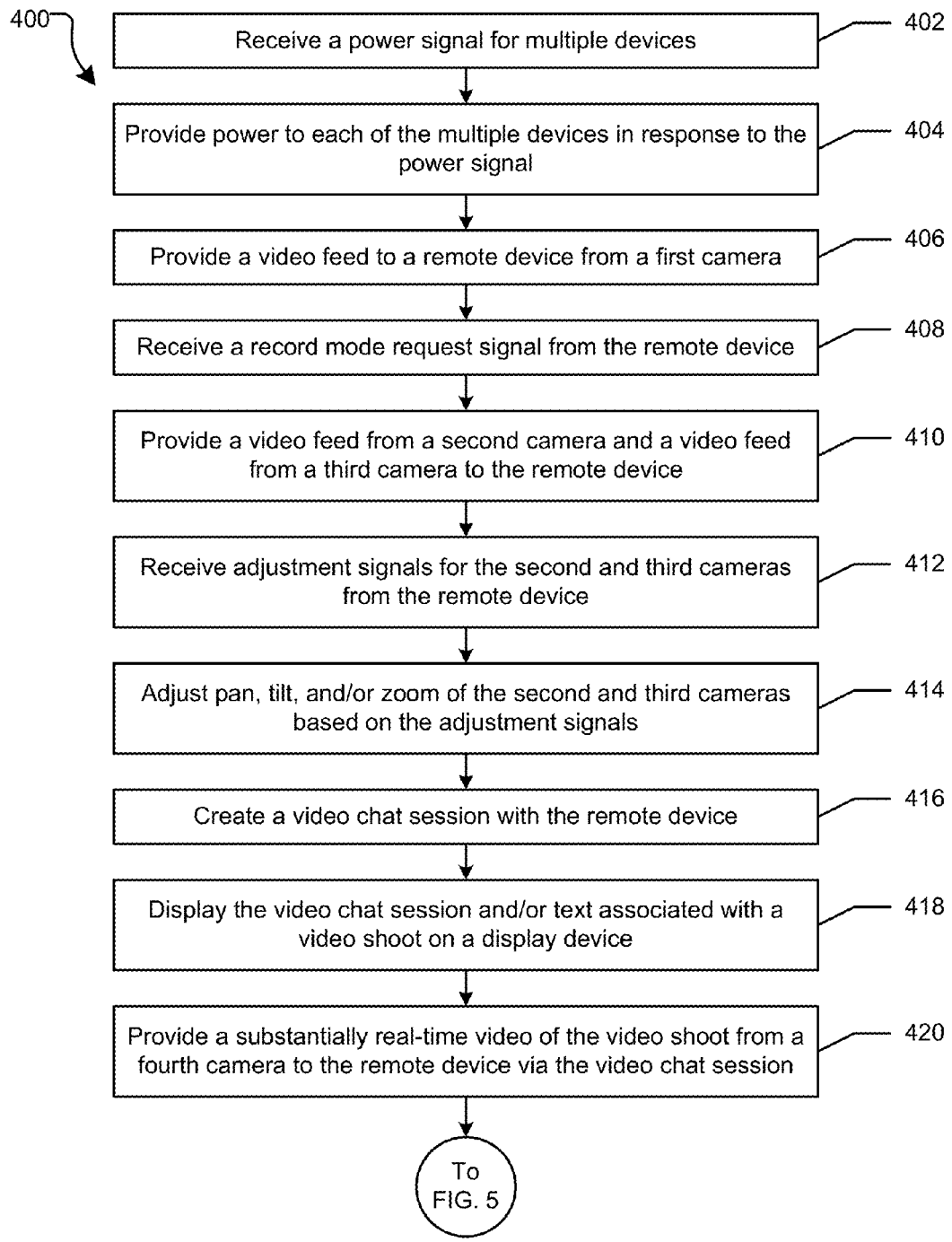
FIGS. 4 and 5 are a flow diagram of a method for remotely configuring and capturing a video production in accordance with at least one embodiment of the present disclosure.
Figure 5:
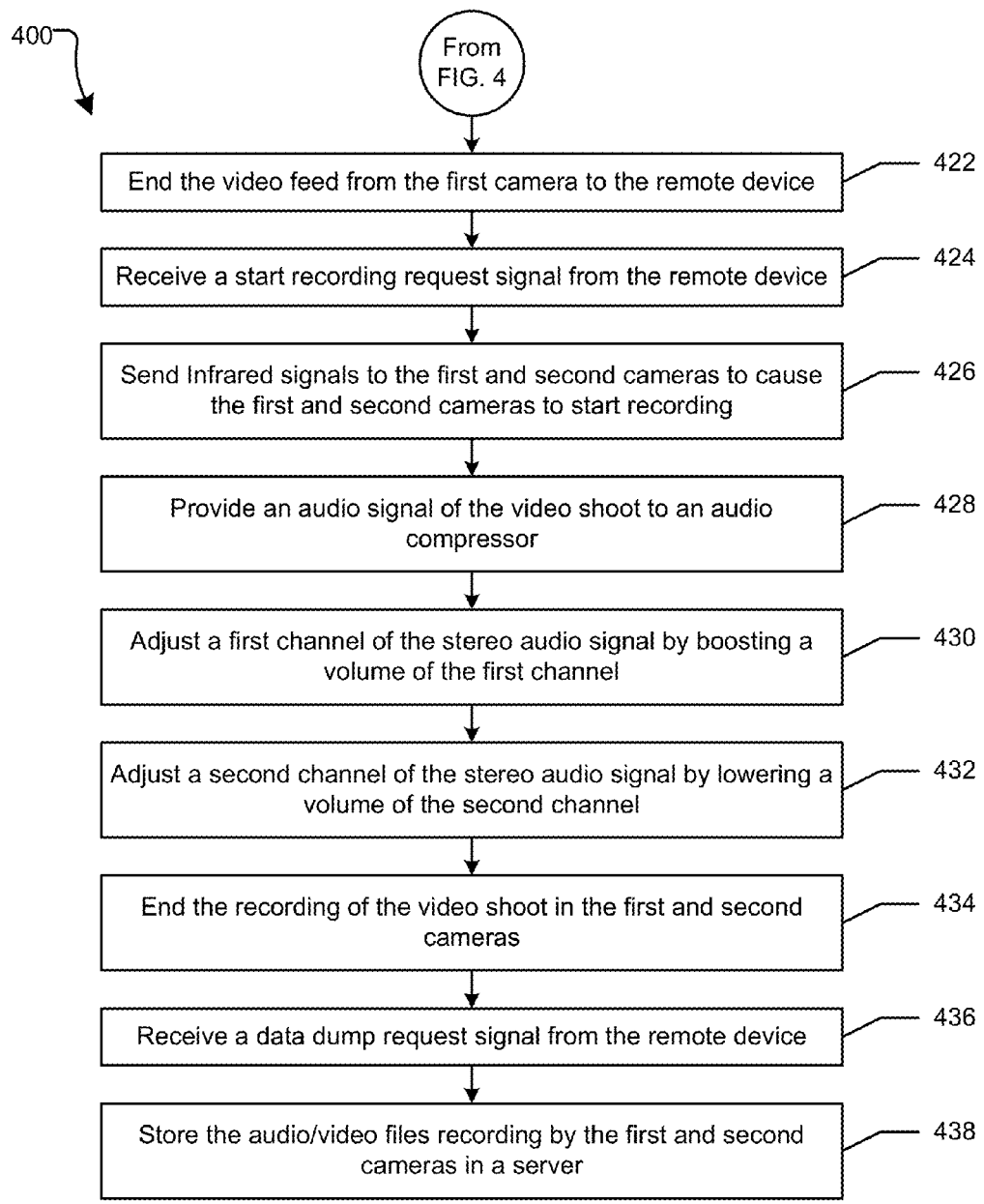

FIGS. 4 and 5 show a flow diagram of a method 400 for remotely configuring and capturing a video production in the studio pod 102 of FIGS. 1 and 3 in accordance with at least one embodiment of the present disclosure. At block 402, the power controller 310 receives a power on request signal for the first and second cameras 114 and 116, the display device 118, the audio compressor 304, and the microphone 124. The power controller 310 can provide power to the respective components to activate the components at block 404. At block 406, the video device 308 provides a video feed from the camera 316 to the remote device 104. At block 408, the connector bridge 302 receives a record mode request signal from the remote device 104. The video device 308 provides a video feed from the camera 114 and a video feed from the camera 116 to the remote device 104 at block 410. The video feeds can be provided when the cameras 114 and 116 are placed in a record mode in response to record mode request signal. At block 412, adjustment signals are received for each of the cameras 114 and 116. Pan, tilt, and/or zoom of each camera are adjusted based corresponding adjustment signals at block 414. In an embodiment, the pan and tilt of the camera 114 can be adjusted based on signals received from the connector bridge at the electronic mount 314. The signals can be WiFi signals, Bluetooth signals, IR signals, or the like. The server 112 creates a video chat session with the remote device 104 at block 416.

At block 418, the server 112 displays the video chat session and text for a video shoot on the display device 118. In another embodiment, the same images displayed on display device 118 can also be displayed on display device 126 at substantially the same time. In another embodiment, the video chat session can be displayed on display device 126, and the text associated with the video shoot can be displayed on the display device 118. At block 420, the server 112 provides a substantially real-time video from the camera 122 to the remote device 104 via the video chat session. The video feed from the camera 316 to the remote device 104 is ended at block 422. The connector bridge 302 receives a start recording request signal for the cameras 114 and 116 at block 424. At block 426, the connector bridge 302 sends IR signals to the cameras 114 and 116 to cause the cameras 114 and 116 to start recording the video shoot. In an embodiment, the IR signals can be transmitted from an IR light emitting diode (LED) at an end of a cable connected to a port of the connector bridge 302. The microphone 124 provides an audio signal to the audio compressor 304 at block 428. In an embodiment, the microphone 124 can provide the audio signal to the camera 116. The audio signal can be split into two signals prior to being provided to either the audio compressor 304 or the camera 116. At block 430, the audio compressor 304 adjusts a first channel of the audio signal by boosting a volume level of the first channel. The audio compressor 304 adjusts a second channel of the audio signal by lowering a volume level of the second channel at block 432.

Figure 6:
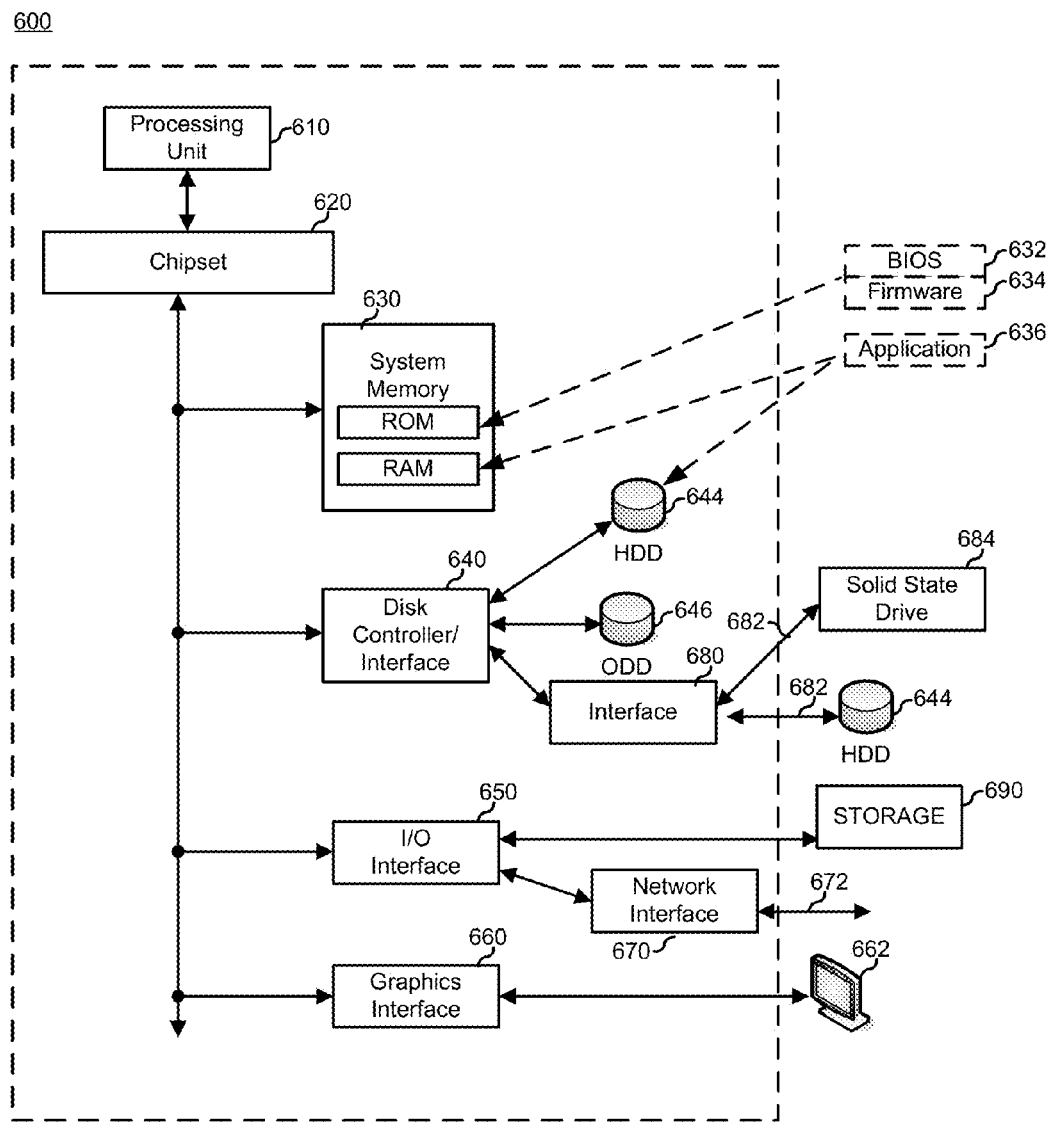
FIG. 6 is a block diagram of a general information handling system in accordance with at least one embodiment of the present disclosure.

The connector bridge 302 causes the cameras 114 and 116 to end the recording of the video shoot at block 430. At block 432, the connector bridge 302 receives a data dump request signal from the remote device 104. The connector bridge 302 changes the mode of the cameras 114 and 116 to a storage mode and then the server 112 stores the videos recorded by the cameras 114 and 116 at block 434. At block 436, the server 112 stores the audio signal along with the videos from the cameras 114 and 116. The audio signal stored in the server 112 can be the adjusted audio signal that has the volume of first channel boosted and the volume of the left channel lowered. In an embodiment, FIG. 6 is a block diagram illustrating an embodiment of a computer or server system 600, such as server 112. The computer or server system 600 includes a processing unit 610, a chipset 620, a system memory 630, a disk controller/interface 640, an input/output (I/O) interface 650, graphics interface 660, and a network interface 670. In a particular embodiment, the computer or server system 600 is used to carry out one or more of the methods described herein. In another embodiment, one or more of the computer or server systems described herein are implemented with a storage database to host the remote video capture system and carry out the methods described herein.

Chipset 620 is connected to processing unit 610 via a bus or other channel, allowing the processing unit to execute machine-executable code. In a particular embodiment, computer or server system 600 may include one or more processing units. Chipset 620 may support the multiple processing units and permit the exchange of data among the processing units and the other elements of the computer or server system. A bus or other channel permits the system to share data among the processing unit, the chipset, and other elements of computer or server system 600.

System memory 630 is connected to chipset 620. System memory 630 and chipset 620 can be connected via a bus or other channel to share data among the chipset, the memory, and other elements of computer or server system 600. In another embodiment, processing unit 610 may be connected to system memory 630. A non-limiting example of system memory 630 includes static random access memory, dynamic random access memory, non-volatile random access memory, read only memory, flash memory, or any combination thereof.

Disk controller/interface 640 is connected to chipset 620. Disk controller/interface 640 and chipset 620 can be connected via a bus or other channel to share data among the chipset, the disk controller, and other elements of computer or server system 600. Disk controller/interface 640 is connected to one or more disk drives. Such disk drives may include an internal or external hard disk drive (HDD) 644, and an optical disk drive (ODD) 646, and can include one or more disk drives as needed or desired. ODD 646 can include a Read/Write Compact Disk (R/W-CD), a Read/Write Digital Video Disk (R/W-DVD), a Read/Write mini Digital Video Disk (R/W mini-DVD), another type of optical disk drive, or any combination. Additionally, disk controller 640 is connected to disk interface 680. Disk interface 680 permits a solid-state drive 684 or external HDD 644 to be coupled to a computer or server system 600 via an external interface 682. External interface 682 can include industry standard busses such as a Universal Serial Bus (USB), IEEE-1394 Firewire, or other proprietary or industry-standard busses. Solid-state drive 684 can alternatively be disposed within the computer or server system 600. Any of the above drivers, individually or in combination, may save as the database storage for the remote video capture system. Alternatively, network links may connect to off-site memory or storage devices to save data as part of a remote video capture system database.

I/O interface 650 may include an I/O controller and is connected to chipset 620. I/O interface 650 and chipset 620 can be connected via a bus or other channel to share data among the chipset, the I/O interface, and other elements of computer or server system 600. I/O interface 650 is connected to one or more peripheral devices via possible intermediate channels and devices. Peripheral devices can include devices such as including a keyboard, mouse, or storage systems 690, graphics interfaces, network interface cards 670, sound/video processing units, or other peripheral devices. Network interface 670 includes one or more network channels 672 that provide an interface between the computer or server system 600 and other devices that are external to computer or server system 600. This includes an interface between the computer or server system 600 that may host the remote video capture system and various wired and wireless networks connected to the mobile devices or computers of consumer members and merchants for executing the methods and system described herein.

Graphics interface 660 is connected to chipset 620 via a bus or other channel which permits exchange of data among the chipset, the graphics interface, and other elements of computer or server system 600. Graphics interface 660 is connected to a video display 662.

Computer or server system 600 includes Basic Input/Output System (BIOS) 632 and firmware code 632, and one or more application programs 636. BIOS code 632 functions initializes the computer server system 600 on power up to launch an operating system, and to manage input and output interactions between the operating system and the other elements of the computer or server system. In a particular embodiment, the BIOS 632 and firmware code 634 and application programs 636 are stored in memory 630. The BIOS code 632, firmware 634, and application programs 636 include machine-executable code that is executed by processing unit 610 to perform various functions of computer or server system 600. In another embodiment, the BIOS code 632, firmware 634, and application programs 636 are stored in another storage medium of computer or server system 600. The BIOS code 632, firmware 634, and application programs 636 can each be implemented as single programs, or as separate programs to implement the methods and remote video capture system described herein. The machine executable code used to execute the computer implemented method steps and create the remote video capture system described herein are examples of application programs 636 in the described embodiments.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The numerous innovative teachings of the present application will be described with particular reference to the exemplary embodiments. However, it should be understood that this class of embodiments provides only a few examples of the many advantageous uses of the innovative teachings herein. In general, statements made in the specification of the present application do not necessarily limit any of the various claimed inventions. To the contrary, the description of the exemplary embodiments are intended to cover alternative, modifications, and equivalents as may be included within the spirit and scope of the invention as defined by the claims. Moreover, some statements may apply to some inventive features but not to others.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:
1. A method comprising:
  receiving, from the remote device, a record mode request signal associated with a first camera and a second camera within an enclosure;
  providing, to the remote device, a first video feed from the first camera and a second video feed from the second camera in response to the record mode request signal;

receiving adjustment signals for each of the first and second cameras;
adjusting a view of each of the first and second cameras based on the adjustment signals;
creating a video chat session between a server within the enclosure and the remote device;
providing a substantially real-time video from a third camera to the remote device via the video chat session;
receiving a start recording request signal for the first and second cameras;
recording a first video in the first camera and a second video in the second camera during;
providing an audio signal associated with the first video and with the second video;
storing the first and second videos in the server; and
storing the audio signal along with the first and second videos in the server.

2. The method of claim 1 further comprising:
receiving a data dump request signal from the remote device prior to storing the first and second videos in the server.

3. The method of claim 1 further comprising:
receiving a data dump request signal from the remote device prior to storing the first and second videos in the server.

4. The method of claim 1 further comprising:
displaying the video chat session and text associated with a video shoot on a display device that is internal to the enclosure.

5. The method of claim 1 further comprising:
adjusting a first channel of the stereo audio signal by boosting a volume level of the first channel; and
adjusting a second channel of the stereo audio signal by lowering a volume level of the second channel.

6. The method of claim 1 further comprising:
receiving a power on signal for multiple devices located within the enclosure; and
powering on the multiple devices in response to the activation signal.

7. The method of claim 6 wherein the multiple devices include the first and second cameras, a display device, and lights.

\* \* \* \* \*